United States Patent [19]

Moody

[11] 4,324,614
[45] Apr. 13, 1982

[54] FLOW DISTRIBUTION SYSTEM FOR COOLANT IN A NUCLEAR REACTOR AND METHOD

[75] Inventor: Edward Moody, Simi, Calif.

[73] Assignee: Electric Power Research Institute, Inc., Palo Alto, Calif.

[21] Appl. No.: 32,361

[22] Filed: Apr. 23, 1979

[51] Int. Cl.³ .............................................. G21C 15/04
[52] U.S. Cl. ..................................... 376/175; 376/352
[58] Field of Search ....................... 176/50, 61, 17, 18, 176/38

[56] References Cited

U.S. PATENT DOCUMENTS

| | | | |
|---|---|---|---|
| 3,158,543 | 11/1964 | Sherman et al. | 176/50 |
| 3,208,913 | 9/1965 | Hennig | 176/61 |
| 3,275,521 | 9/1966 | Schluderberg et al. | 176/61 |
| 3,486,973 | 12/1969 | Georges et al. | 176/61 |
| 3,892,625 | 7/1975 | Patterson | 176/61 |
| 3,928,129 | 12/1975 | Goetzmann | 176/61 |
| 3,937,653 | 2/1976 | Leheu | 176/61 |
| 4,032,398 | 6/1977 | Cross et al. | 176/61 |
| 4,202,726 | 5/1980 | Duncombe et al. | 176/61 |

FOREIGN PATENT DOCUMENTS 2808370 9/1978 Fed. Rep. of Germany ........ 176/61

*Primary Examiner*—Harvey E. Behrend
*Attorney, Agent, or Firm*—Flehr, Hohbach, Test

[57] ABSTRACT

A nuclear reactor including an inner core containing both fuel and blanket assemblies and means for cooling the assemblies by passing liquid coolant, specifically sodium, across and in contact with the latter is disclosed herein. The nuclear reactor also includes a particular technique for distributing the liquid coolant into first and second separate plenums, each of which includes an inlet adapted to receive the coolant. These first and second plenums are maintained in fluid communication with the fuel and blanket assemblies, respectively, whereby to pass received coolant across and in contact with all of the assemblies. In addition, the distribution of the coolant is automatically changed, at least to a limited extent, between these first and second plenum in response to predetermined thermal changes in said assemblies.

4 Claims, 7 Drawing Figures

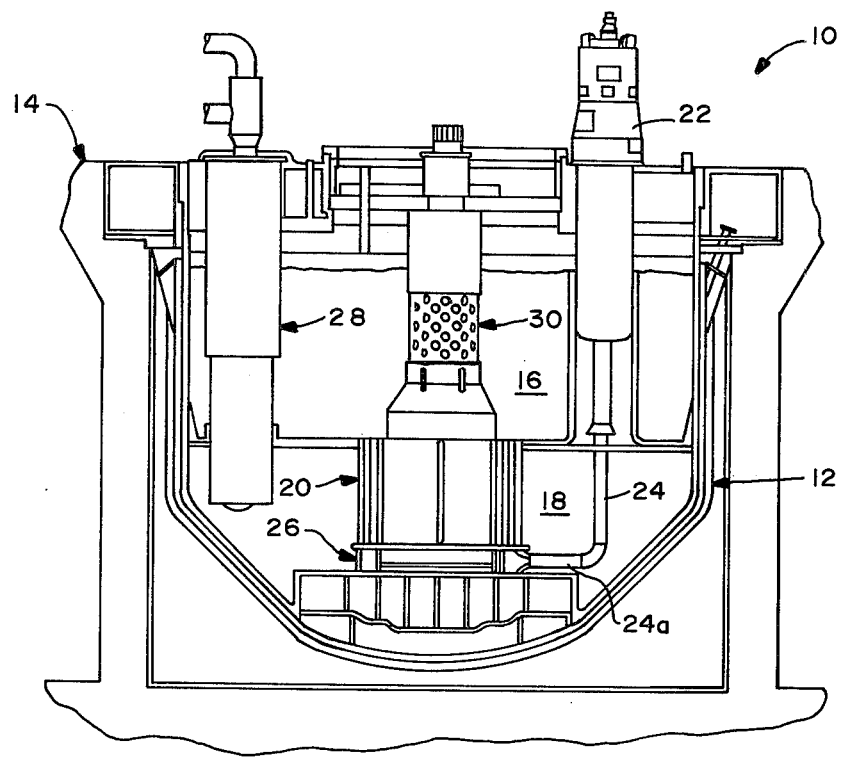
FIG.—1
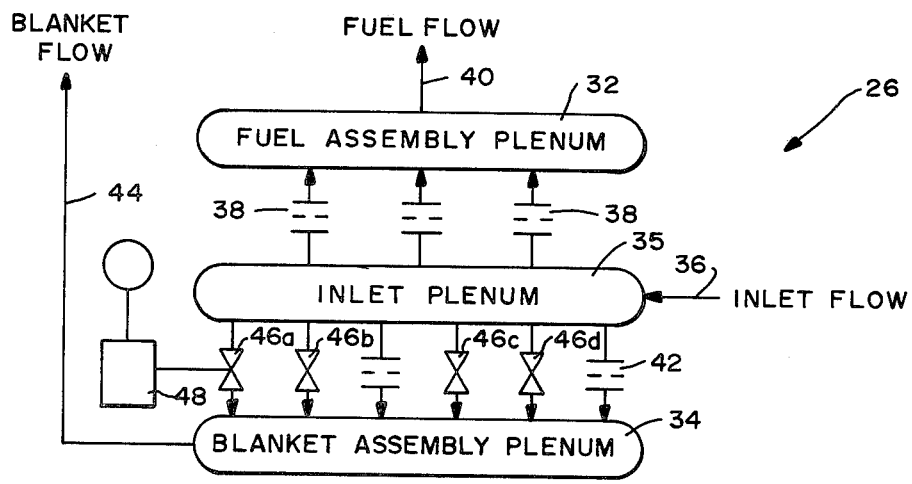
FIG.—2

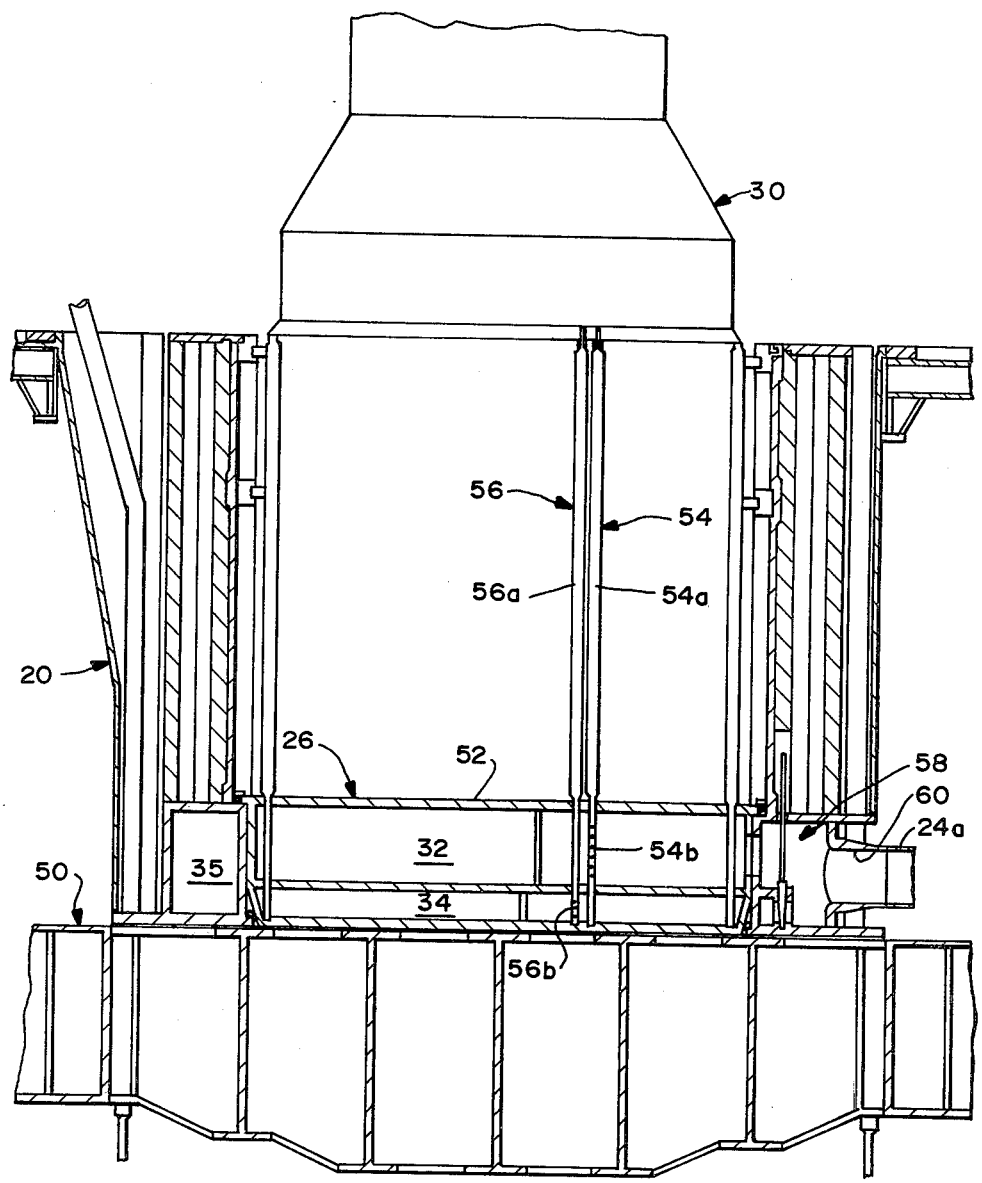
FIG.—3

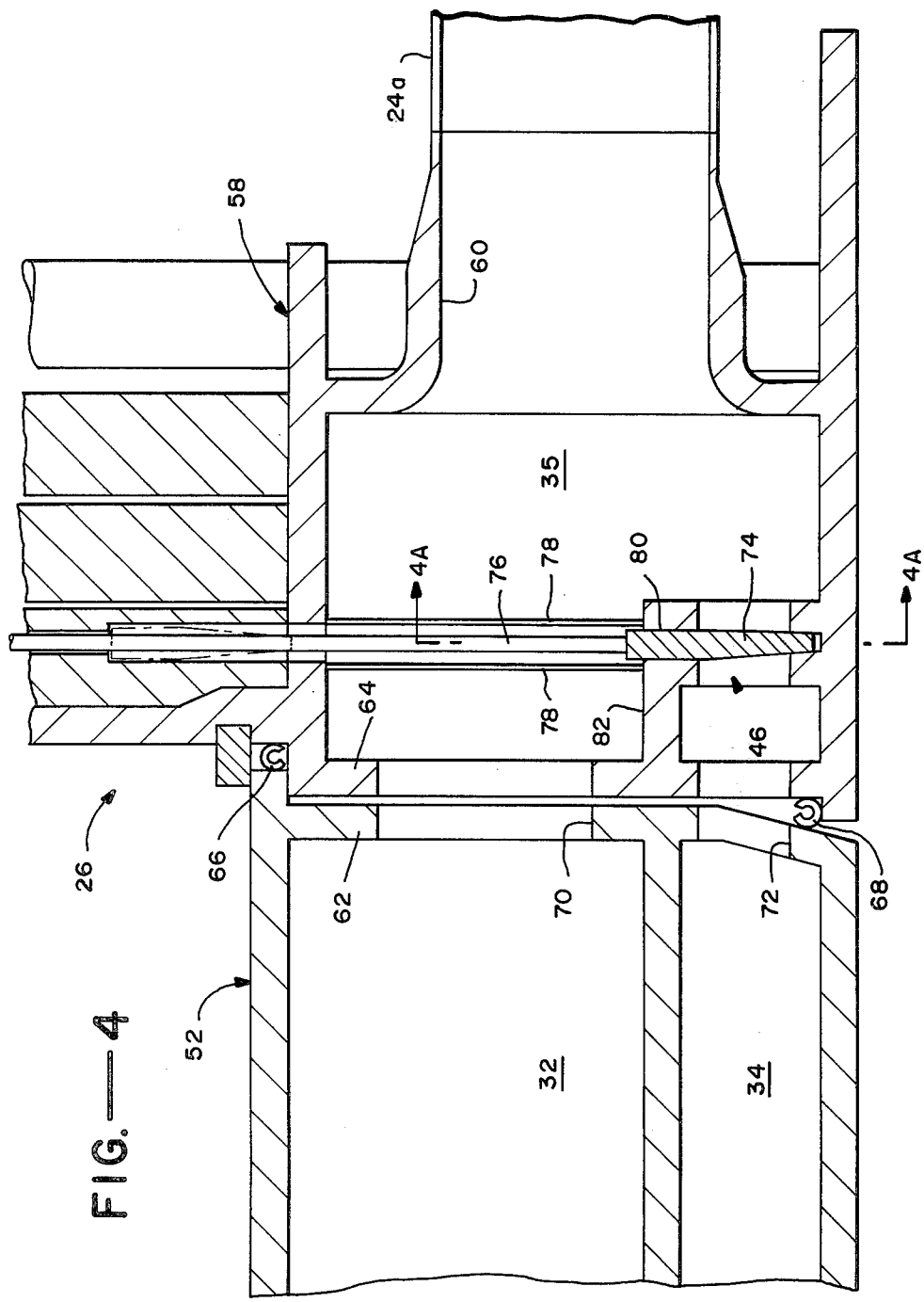
FIG.—4

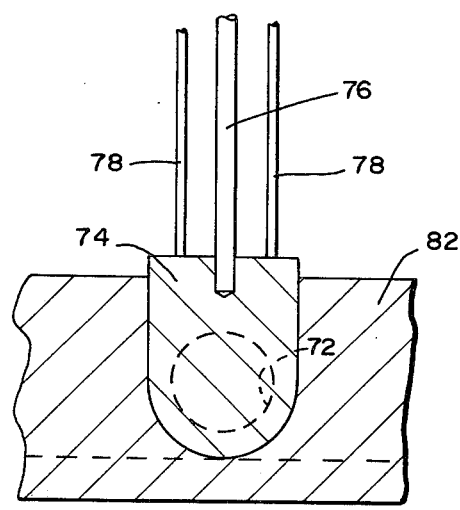
FIG.—4A
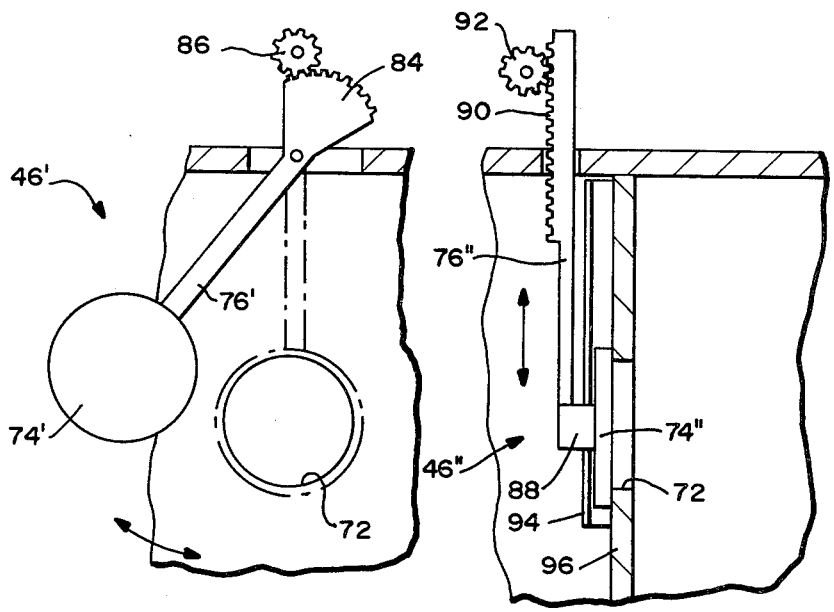
FIG.—5  FIG.—6

FLOW DISTRIBUTION SYSTEM FOR COOLANT IN A NUCLEAR REACTOR AND METHOD

The present invention relates generally to nuclear reactors of the type including an inner core containing both fuel (also referred to as driver) and blanket assemblies and more particularly to a thermally responsive technique for distributing liquid coolant, specifically sodium in a preferred embodiment, across and in contact with the fuel and blanket assemblies.

The nuclear reactor to be described in more detail hereinafter is one which includes an inner core containing both fuel and blanket assemblies, as stated above, and it also includes means for cooling the assemblies by passing liquid coolant, for example sodium, across and in contact with the latter. In an actual embodiment, the core and its fuel and blanket assemblies are located under what is commonly referred to as an instrument tree and the cooling means just recited includes a pump for initiating the flow of liquid coolant to be ultimately delivered to the fuel and blanket assemblies and thereafter to an internal heat exchanger.

In the nuclear reactor thus far described, which may be for example a liquid metal fast breeder reactor, the levels of power generation by its fuel and blanket assemblies change during the residence time of these elements. More specifically, the fuel assembly power decreases and the blanket assembly power increases. In order to maintain uniform coolant temperatures throughout the core which, in turn, provides for economical operation of the latter or at least to compensate for changes in temperature at the assemblies (specifically at their outlets), it is desirable to provide means of varying the coolant flow to each group of assemblies, that is, to the fuel or driver assemblies and the blanket assemblies, over the fuel cycle, that is, over the operational life of the fuel assemblies. However, it is also necessary to insure that there is no possibility of reducing flow to either group below a level which would result in exceeding allowable fuel cladding temperature. As will be seen hereinafter, the present invention satisfies both of these requirements in an economical and uncomplicated way.

In view of the foregoing, one object of the present invention is to provide an uncomplicated and yet reliable technique for distributing coolant to the fuel and blanket assemblies of a nuclear reactor of the type described in response to predetermined thermal changes in these assemblies during operation of the reactor.

A more specific object of the present invention is to automatically increase the amount of coolant distributed to the blanket assemblies in predetermined increments as the temperature of these assemblies increase during operation of the reactor.

Still another object of the present invention is to provide a thermally responsive distribution technique which assures that each group of assemblies receives a minimum necessary amount of coolant during operation of the reactor regardless of thermal conditions.

As stated above, the nuclear reactor disclosed herein includes an inner core containing both fuel and blanket assemblies and means for cooling the assemblies by passing liquid coolant across and in contact with the latter. In accordance with the present invention, this reactor also includes a flow distribution system which is designed to meet the foregoing objects. As will be seen hereinafter, this distribution system includes first and second plenum means, each of which includes inlet means adapted to receive the coolant. These first and second plenum means are maintained in fluid communication with the fuel assemblies and blanket assemblies, respectively, whereby to pass received coolant across and in contact with the assemblies. The distribution system also includes means for automatically changing the distribution of the coolant, at least to a limited extent, between the first and second plenum means in response to a predetermined thermal change in the assemblies.

In a preferred embodiment, as will also be seen hereinafter, the thermal changes just recited are changes in temperature at the blanket assemblies, so that predetermined increases in temperature at the latter cause predetermined increases of coolant to be distributed to the second plenum means for passage along and in contact with the blanket assemblies. Moreover, in this preferred embodiment, the distribution system provides at least a minimum continuous flow of coolant to each group of assemblies at all times during operation of the reactor regardless of the thermal conditions in the assemblies.

FIG. 1 is an elevational view, partially in section, of a nuclear reactor including an inner core containing both fuel and blanket assemblies and a system for distributing coolant to both groups of assemblies, which system is designed in accordance with the present invention.

FIG. 2 is a schematic illustration of the flow distribution system illustrated in FIG. 1.

FIG. 3 is an enlarged vertical sectional view of a part of the reactor of FIG. 1, particularly illustrating its flow distribution system.

FIG. 4 is an enlarged vertical sectional view of a section of the distribution system illustrated in FIGS. 1 and 3.

FIG. 4A is a sectional view of part of the distribution system illustrated in FIG. 4, taken generally along line 4A4A in FIG. 4.

FIG. 5 diagrammatically illustrates a particular embodiment of a valve which may comprise part of the system illustrated in FIGS. 4 and 4A.

FIG. 6 diagrammatically illustrates another particular embodiment of a valve which may be used in the system of FIGS. 4 and 4A.

Turning now to the drawings, wherein like components are designated by like reference numerals throughout the various figures, a nuclear reactor generally indicated by the reference numeral 10 is illustrated in FIG. 1. In a preferred embodiment, this reactor is a liquid metal fast breeder reactor but may be of any other type compatible with the present invention to be described hereafter.

The reactor shown in FIG. 1 includes a main vessel structure 12 including a reactor vessel 12a and guard vessel 12b which extend below a reactor cover assembly 14 and which contain a number of reactor components within a pool of hot sodium generally indicated at 16 and a pool of cold sodium generally indicated at 18. The reactor vessel may be supported in this position and designed conventionally or in accordance with copending United States Patent Application Ser. No. 032,283, filed Apr. 23, 1979 and entitled NUCLEAR REACTOR INCLUDING A REACTOR VESSEL AND TECHNIQUE FOR SUPPORTING THE LATTER this application having been assigned to Assignee of the present application. The guard vessel may be supported conventionally or as disclosed in co-pending United States Patent Application Ser. No. 032,285, filed Apr. 23, 1979 and entitled NUCLEAR REACTOR GUARD VESSEL ARRANGEMENT, the application having been assigned to the Assignee of the present application. The reactor components within the vessel structure include a central core 20 containing both fuel and blanket assemblies to be described in more detail hereinafter and means for cooling these assemblies by passing liquid coolant, specifically liquid sodium, across and in contact with the latter. The cooling means to accomplish this includes a pump 22, discharge piping 24 and a system 26 designed in accordance with the present invention and provided for distributing the coolant between the fuel assemblies and the blanket assemblies, as will be discussed hereinafter.

Other reactor components include an internal heat exchanger (IHX) 28 adapted to receive the coolant from the hot pool after the latter passes through the fuel and blanket assemblies, an instrument tree 30 mounted over the core and other components which may or may not be illustrated but which are not pertinent to the present invention. All of these reactor components including the ones recited above, with the exception of distribution system 26, may be readily provided by those with ordinary skill in the art and, hence, will not be discussed in detail herein except where necessary for a better understanding of the present invention. For the moment, it should suffice to say that the fuel assemblies and blanket assemblies contained within core 20 must be cooled during the operation of the reactor and this is carried out by the cooling means recited above. More specifically, liquid sodium acting as a coolant is pumped from the cold pool 18 through discharge piping 24 by pump 22 for passing ultimately through the fuel and blanket assemblies and thereafter into and through IHX 28 from the hot pool 16.

As stated previously, the level of power generation of the fuel and blanket assemblies contained within core 20 changes during operation of reactor 10. More specifically, the fuel assembly power decreases resulting in a decrease in temperature at the fuel assembly and the blanket assembly power increases resulting in an increase in temperature. As will be seen in more detail hereinafter, distribution system 26 which actually comprises part of the overall cooling means recited above has been designed to take into account these thermal changes. This is illustrated schematically in FIG. 2 which shows a fuel assembly plenum 32, a separate blanket assembly plenum 34 and an interconnecting inlet plenum 35. Liquid coolant (the sodium) first enters the inlet plenum as indicated by arrow 36 which actually represents the previously recited discharge piping 24.

Throughout reactor operation, a continuous supply of coolant passes from the inlet plenum to the fuel assembly plenum through cooperating orifices 38 and thereafter across and in contact with all of the fuel assemblies in core 20, as generally indicated by the arrow 40. At the same time, in accordance with one aspect of the present invention, at least a predetermined minimum amount of liquid coolant entering the inlet plenum is at all times during operation of the reactor directed into the blanket assembly plenum 34 through at least one but preferably a plurality of orifices 42. The coolant entering the blanket assembly plenum is thereafter passed across and in contact with all of the blanket assemblies contained within core 20, as indicated generally by arrow 44. The exact minimum amount of coolant which is passed across and in contact with the blanket assemblies at all times should be enough to prevent the temperature at any assembly from exceeding its allowable fuel cladding temperature. This is also true for the fuel assemblies. In both cases, one with ordinary skill in the art could readily determine the necessary minimum amount of coolant required to accomplish this depending upon the overall design of the reactor and the varying assemblies in particular.

In accordance with another aspect of the present invention, distribution system 26 is responsive to predetermined thermal changes in the fuel and blanket assemblies. More specifically, as seen in the schematic illustration of FIG. 2, the blanket assembly plenum 34 is not only interconnected with the inlet plenum by means of orifices 42, but also by means of at least one but preferably a plurality of power actuated valves 46a, b, c, d, etc. These valves are controlled by one or more thermocouples or other suitable temperature sensing and transducing means and conventional circuitry including the necessary power (for example, electric or pneumatic power) for opening the valves at predetermined temperatures. One such thermocouple generally indicated at T and the appropriate circuitry, generally indicated at 48, are shown schematically in FIG. 2. The thermocouples or other such temperature sensing and transducing means are located in the appropriate positions to measure the temperature at the blanket assemblies contained within core 20.

In a preferred embodiment of system 26, a pair of thermocouples T is located at the outlet of each blanket assembly for measuring the temperature of coolant flowing out of that assembly, thereby indicating the temperature at the assembly. In this preferred embodiment, all of these temperature sensing means are interconnected through circuitry 48 to the various valves 46. The circuitry includes conventional means for turning on the valves at different temperature levels as sensed by the thermocouples. For example, distribution system 26 may be designed such that none of the valves open until the temperature reaches a predetermined level, for example, 10° F. above the normal (desired) operating temperature of the reactor. During this initial stage, the only liquid coolant received by the blanket assemblies is the coolant which passes through the orifices 42. When at least one blanket assembly reaches the level just recited, one of the valves 46, for example valve 46a, opens thereby increasing the amount of coolant passing into blanket assembly plenum 34 and thereafter to the blanket assemblies. This of course decreases the amount of coolant distributed to plenum 32. At the same time, it brings back the temperature at the blanket assemblies to their normal operating temperature. As the blanket assemblies again rise in temperature to the same predetermined level referred to above, for example the 10° F. previously mentioned, as sensed by cooperating thermocouples of at least one of the blanket assemblies, a second valve, for example valve 46b, opens (while valve 46a remains locked open), thereby increasing the amount of coolant passing to the blanket assemblies still further (and decreasing their temperature) and decreasing the amount passed to the fuel assemblies. This procedure continues until all of the valves are locked open to provide a maximum amount of coolant to the blanket assemblies for maintaining the temperature thereat at the normal (desired) operating temperature.

From the foregoing, it should be apparent that the exact way in which the valves 46 are opened will vary depending upon the number of orifices 42 and valves 46 interconnecting the inlet plenum and the blanket assembly plenum, the amount of coolant capable of being passed by each of these components and the necessary amount of coolant required to control the desired temperature of the blanket assemblies during the operation of reactor 10. Moreover, while flow distribution system 26 in its preferred embodiment includes a number of valves which open in incremental temperature stages, it is to be understood that the system could utilize a single valve or a plurality of valves simultaneously opened at one temperature. In any event, circuitry 48 could be readily provided in conjunction with the temperature sensing means to control the valves in the desired manner in order to maintain a predetermined temperature profile during operation of the reactor. In addition, while not shown, valves controlled in the same way as valves 46, that is, by temperature sensing means and appropriate circuitry, could be provided between the inlet plenum and the fuel assembly plenum for controlling the amount of sodium passing therebetween in response to changes in temperature at the fuel assemblies. However, in normal operation, the temperature at the fuel assembly decreases while the temperature at the blanket assemblies increase, as stated previously. Therefore, by increasing the flow of coolant from the inlet plenum to the blanket assembly plenum, the flow to the fuel assembly plenum automatically decreases without the use of additional valve means.

Having described the flow distribution assembly diagrammatically and the way it operates to distribute coolant in response to thermal change in the blanket and fuel assemblies, attention is now directed to the structural design of the system as best shown in FIGS. 3, 4, 4A, 5 and 6. As seen specifically in FIG. 3, previously recited core 20 and distribution system 26 are shown on top of a reactor support structure generally indicated at 50. As also seen in this figure, system 26 includes what may be considered a housing 52 located at the bottom and forming the base of core 20. This housing includes previously described fuel assembly plenum 32 and blanket assembly plenum 34 extending across the entire bottom end of the core with the fuel assembly plenum 32 being located directly above the blanket assembly plenum.

FIG. 3 also illustrates one of a plurality of the previously fuel assemblies, generally indicated at 54, and one of a plurality of the previously recited blanket assemblies, generally indicated at 56. Each of these assemblies is known in the art and will not be described in detail. It should suffice to say that each includes an outer tubular housing 54a and 56a, respectively, for containing the required components and for passing the fluid coolant therethrough for cooling these components. In this regard, each fuel assembly 54 is in fluid communication with the fuel assembly plenum 32 by means of a plurality of openings 54b located through its tubular housing along a section of the housing within plenum 32, as seen in FIG. 3. Each of the blanket assemblies is placed in fluid communication with lower plenum 34 in the same way, that is, by means of openings 56b in its tubular housing along a section of the housing located in the plenum 34. In this way, liquid coolant entering the upper plenum 32 passes through the openings 54b in the various fuel assemblies for passage along and in contact with the inner components of these assemblies for cooling the latter. At the same time, liquid coolant passing in lower chamber 34 passes into the openings 56b in the various blanket assemblies for passage along and in contact with the inner components of these assemblies. The coolant passing through all of these assemblies pass out the top ends thereof and into previously recited hot pool 16 for passage through IHX 28.

Still referring to FIG. 3, it can be seen that flow distribution system 26 also includes a second housing 58 located concentrically around housing 52 and providing the previously recited inlet plenum 35 which is annular in configuration and which extends around the outsides of plenums 32 and 34. Housing 58 includes a plurality of circumferentially spaced inlets 60, only one of which is shown in FIG. 3. This inlet and the other inlets, not shown, are respectively connected with discharge piping 24 for placing the discharge piping in fluid communication with the inlet plenum. In this regard, the discharge piping includes a bottom section 24a for each inlet and in a preferred embodiment there are eight such inlets.

Turning now to FIG. 4, adjacent sections of the housings 52 and 58 including sections of plenum 32, 34 and 35 are shown. As seen in this figure, the two housings include separate adjacent walls 62 and 64, although a single continuous wall could be provided. Suitable seal means, generally indicated at 66 and 68, are provided for sealing between these walls. The two adjoining walls 62 and 64 define a continuous, opened inlet 70 between the fuel assembly plenum 32 and inlet plenum 35 and a continuous, opened inlet 72 between blanket assembly plenum 34 and the inlet plenum. In a preferred embodiment, there are a plurality of inlets 70, for example eight such inlets circumferentially spaced from one another about the plenums and there are a plurality of inlets 72, for example 20 such inlets circumferentially spaced from one another about the plenums. All of the inlets 70 are maintained opened throughout the operation of reactor 10 and correspond to previously described orifices 38 in FIG. 2. In a preferred embodiment, some but not all of the inlets 72 remain open during the entire operation of reactor 10 and hence correspond to the previously described orifices 42 in FIG. 2. The remaining inlets 72 include the previously described valves 46, one of which is shown in FIG. 4 and FIG. 4A. As just stated by way of example, there are twenty inlets 72. In a preferred embodiment, fifteen include valves and five do not.

The valves themselves may be of any conventional type sufficient to open and close their associated inlets 72 at the proper time. For example, the valve shown in FIGS. 4 and 4A includes a valve member 74 supported at the lower end to a center rod 76 and one or more guide rods 78 which are best seen in FIG. 4A. While not shown, the tops of these rods are connected to suitable means for raising and lowering its valve member between an inlet closing position shown in FIGS. 4 and 4A and an inlet opening raised position, not shown. As seen in these latter figures, when the valve member is in its lowered inlet closing position, it is located within a cooperating slot 80 provided in a flange 82 which in part defines inlet 72. The flange around inlet 72 and member 74 cooperate to provide a sealed closure around the inlet.

All of the valves 46 may be identical to the one just described or, as stated above, they may be of any suitable design for opening and closing their associated inlets at the appropriate moment. Another valve design which may be used is shown in FIG. 5 generally indicated by the reference numeral 46'. This valve is shown including a valve member 74' mounted at one end to a stem 76' which carries a rack 84 at its other end. Stem 76' is mounted by suitable means (not shown) for pivotal movement between the solid line position shown in FIG. 5 and its dotted line position. With the valve member in its solid line position, the inlet 72 is maintained opened and with the valve member in its dotted line position, the inlet is closed. In this regard, suitable guide means such as the previously mentioned slot 80 could be provided for assuring a tight fit when the valve member is in its inlet closing position. The valve stem and its valve member are movable between these two positions by means of rack 84 and a cooperating pinion 86 which is driven by suitable means (not shown) depending upon previously described circuitry 48 and the thermocouples T or other such temperature sensing means.

Still another valve design is illustrated in FIG. 6. There, a valve 46" is shown including a valve member 74" fixedly attached to the bottom end of a rod 76" by means of a coupling 88. Rod 76" includes a top threaded section generally indicated at 90 which comprises the rack part of a rack and pinion drive, also including pinion 92. This latter component is driven by suitable means (not shown) for raising and lowering rod 76" and therefore valve member 74" between an inlet opening position (not shown) and the inlet closing position shown in FIG. 6. The valve member 74" can be raised and lowered in a slot similar to slot 80. On the other hand, as shown in FIG. 6, a valve guide 94 can be provided adjacent corresponding inlet 72 in a plenum divider which may be part of housing 58 or it may be a single plenum divider 96 provided between the inlet plenum and the two assembly plenums.

What is claimed is:

1. In a nuclear reactor including an inner core containing both fuel assemblies and blanket assemblies and means for cooling the assemblies by passing liquid coolant across and in contact with the latter, a flow distribution system comprising an inlet plenum having inlet means for receiving a continuous supply of said coolant, a fuel plenum including a plurality of inlets remaining opened at all times during operation of the reactor for continuously receiving coolant from said inlet plenum, a blanket plenum including at least one inlet remaining opened at all times during operation of the reactor for continuously receiving a lesser amount of coolant from said inlet plenum than the amount passing into said fuel plenum through its plurality of inlets, said fuel and blanket plenums being in fluid communication with said fuel assemblies and blanket assemblies, respectively, for passing received coolant across and in contact with said assemblies, and means for automatically changing the distribution of coolant between said fuel and blanket plenums in response to predetermined changes in temperature at said assemblies, said distribution changing means including a plurality of second inlets into said blanket plenum from said inlet plenum and an equal plurality of valve means for opening predetermined ones of said second inlets at different times as the temperature at said blanket assemblies increases for automatically increasing the amount of coolant passing into said blanket plenum and decreasing the amount of coolant passing into said fuel plenum whereby to provide said change in coolant distribution, said valve means including means responsive to said temperature changes for opening said second inlets, whereby increases in temperature at said blanket assemblies cause an increase of said coolant to be distributed to said blanket plenum for passage to said blanket assemblies and an automatic decrease in coolant to be distributed to said fuel plenum for decreasing the amount of coolant passing to said fuel assemblies.

2. A system according to claim 1 wherein said coolant is liquid sodium.

3. A system according to claim 2 wherein all of said plenums are disposed below said inner core.

4. A system according to claim 1 wherein the amount of coolant passing into said blanket plenum through the continuously opened inlet or inlets of the latter is sufficient to maintain said blanket assemblies below a predetermined temperature at all times.

* * * * *